US012675970B2

(12) United States Patent
Lohar et al.

(10) Patent No.: US 12,675,970 B2
(45) Date of Patent: Jul. 7, 2026

(54) SYSTEMS FOR TARGETED IMAGE DETECTION THROUGHOUT COMPUTING NETWORKS

(71) Applicant: BANK OF AMERICA CORPORATION, Charlotte, NC (US)

(72) Inventors: Sanjay Arjun Lohar, Charlotte, NC (US); Kyle Mayers, Charlotte, NC (US); Karen Stanek McFeeters, York, SC (US); Elias J. Risola, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 449 days.

(21) Appl. No.: 18/092,497

(22) Filed: Jan. 3, 2023

(65) Prior Publication Data

US 2024/0221349 A1 Jul. 4, 2024

(51) Int. Cl.
| | |
|---|---|
| *G06V 10/75* | (2022.01) |
| *G06F 16/955* | (2019.01) |
| *G06V 20/20* | (2022.01) |
| *G06V 20/30* | (2022.01) |
| *G06V 20/40* | (2022.01) |

(52) U.S. Cl.
CPC .......... *G06V 10/75* (2022.01); *G06F 16/9558* (2019.01); *G06V 20/20* (2022.01); *G06V 20/30* (2022.01); *G06V 20/40* (2022.01); *G06V 2201/09* (2022.01)

(58) Field of Classification Search
CPC ................................................... G06V 20/625
See application file for complete search history.

(56) References Cited

U.S. PATENT DOCUMENTS

| | | | |
|---|---|---|---|
| 8,498,455 | B2 | 7/2013 | Ke et al. |
| 9,218,364 | B1 | 12/2015 | Garrigues et al. |
| 9,280,531 | B2 | 3/2016 | Ling, III et al. |

(Continued)

FOREIGN PATENT DOCUMENTS

| | | | | |
|---|---|---|---|---|
| CN | 112149063 A | * | 8/2013 | ............. G06F 16/58 |
| CN | 103905915 A | * | 7/2014 | |

(Continued)

*Primary Examiner* — Di Xiao
(74) *Attorney, Agent, or Firm* — Moore & Van Allen PLLC; Nicholas C. Russell

(57) ABSTRACT

Detecting targeted images, as well as variations thereof within computing networks, such as the Internet and the Metaverse. Navigation to predetermined websites and accessing the HTML code to search for image file extensions and, in some instances video file extensions within the listing of URLs. In response to finding URLs with image or video file extensions, the hyperlink is activated to navigate to the webpage containing the associated image or video and the image or video is downloaded for purposes of target image detection analysis. A virtual surveillance drone is deployed within virtual reality computing systems to navigate the entirety of the environment to search for images or, in some instances videos that may be displayed and, more specifically, images that appear to match or resemble the targeted image. The drone is capable of capturing the images and communicating the images to non-virtual computing systems for purposes of target image detection analysis.

16 Claims, 6 Drawing Sheets

(56)  References Cited

U.S. PATENT DOCUMENTS

|  |  |  |  |  |
|---|---|---|---|---|
| 9,553,918 | B1 | 1/2017 | Manion et al. | |
| 9,767,348 | B2 | 9/2017 | Klare et al. | |
| 10,109,017 | B2 | 10/2018 | Bothwell et al. | |
| 10,223,454 | B2 | 3/2019 | Folkens et al. | |
| 10,262,356 | B2 | 4/2019 | Davis et al. | |
| 10,387,379 | B2 | 8/2019 | Desineni et al. | |
| 10,402,545 | B2 | 9/2019 | Gorfein et al. | |
| 10,504,145 | B2 | 12/2019 | Garg | |
| 10,630,639 | B2 | 4/2020 | Bilsten | |
| 10,902,051 | B2 | 1/2021 | Hu et al. | |
| 11,861,528 | B1 * | 1/2024 | Brager | G06Q 50/184 |
| 2016/0125270 | A1 | 5/2016 | Gokturk et al. | |
| 2017/0069077 | A1 * | 3/2017 | Zhang | G06V 10/462 |
| 2020/0195688 | A1 * | 6/2020 | Prakash | G06F 21/44 |
| 2021/0374415 | A1 | 12/2021 | He et al. | |

FOREIGN PATENT DOCUMENTS

| | | | | |
|---|---|---|---|---|
| CN | 116881539 | A | * | 10/2023 |
| JP | 2013156946 | A | * | 8/2013 |

* cited by examiner

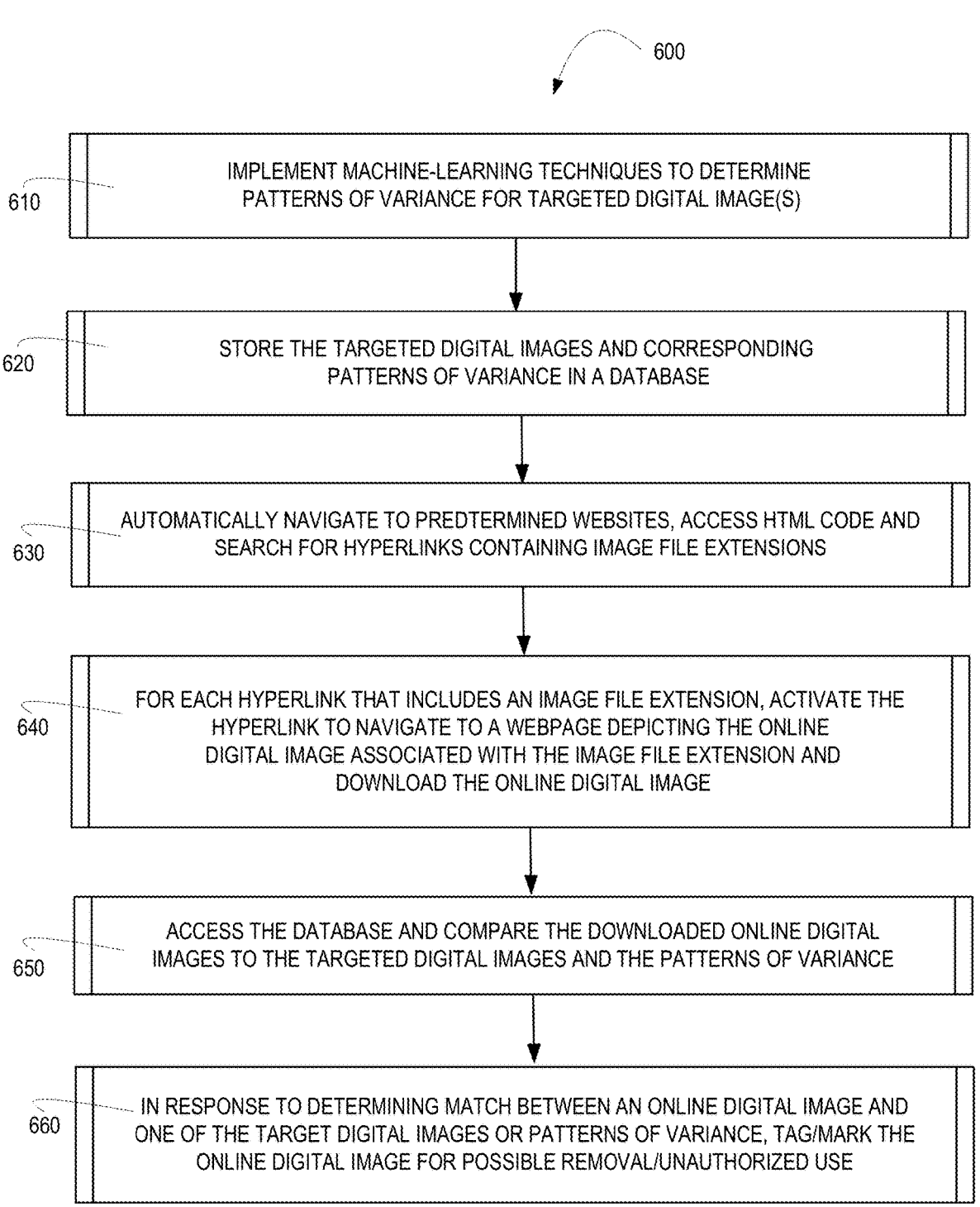

600

IMPLEMENT MACHINE-LEARNING TECHNIQUES TO DETERMINE
PATTERNS OF VARIANCE FOR TARGETED DIGITAL IMAGE(S)

610

STORE THE TARGETED DIGITAL IMAGES AND CORRESPONDING
PATTERNS OF VARIANCE IN A DATABASE

620

AUTOMATICALLY NAVIGATE TO PREDTERMINED WEBSITES, ACCESS HTML CODE AND
SEARCH FOR HYPERLINKS CONTAINING IMAGE FILE EXTENSIONS

630

FOR EACH HYPERLINK THAT INCLUDES AN IMAGE FILE EXTENSION, ACTIVATE THE
HYPERLINK TO NAVIGATE TO A WEBPAGE DEPICTING THE ONLINE
DIGITAL IMAGE ASSOCIATED WITH THE IMAGE FILE EXTENSION AND
DOWNLOAD THE ONLINE DIGITAL IMAGE

640

ACCESS THE DATABASE AND COMPARE THE DOWNLOADED ONLINE DIGITAL
IMAGES TO THE TARGETED DIGITAL IMAGES AND THE PATTERNS OF VARIANCE

650

IN RESPONSE TO DETERMINING MATCH BETWEEN AN ONLINE DIGITAL IMAGE AND
ONE OF THE TARGET DIGITAL IMAGES OR PATTERNS OF VARIANCE, TAG/MARK THE
ONLINE DIGITAL IMAGE FOR POSSIBLE REMOVAL/UNAUTHORIZED USE

SYSTEMS FOR TARGETED IMAGE DETECTION THROUGHOUT COMPUTING NETWORKS

FIELD OF THE INVENTION

The present invention is related generally to digital image detection in computing networks and, more specifically, systems and methods for detecting targeted images and variations thereof within websites of the Internet and within virtual reality computing systems, such as the Metaverse.

BACKGROUND

The ability to detect use of specific images within computing networks, such as the Internet or the Metaverse is important for purposes of cyber security as well as physical. Such specific images may include protected images (e.g., logos, brand marks or the like), images of individuals or any other image containing an object of interest. In certain instances, publicly accessible websites may intentionally or unintentionally contain protected images without the authorization of the entity controlling the protected images. In other instances, images of individual may exist on websites without the authorization of the individual or may assist in locating an individual whose whereabouts are unknown.

Current means for detecting specific images within the Internet rely on periodically capturing screenshots of websites and comparing the images in the screenshot to images of interest (herein, referred to as a "target image"). However, since many websites employ the use of rotating banners, in which the images displayed periodically change, merely capturing screenshots may not provide the ability to assess all of the images that are displayed on a website.

Moreover, the use of augmented and/or virtual reality computing systems (collectively referred to herein as "virtual reality (VR) computing systems) have become increasing more prevalent. By way of example, the Metaverse is a hypothetical iteration of the Internet as a single, universal, and immersive virtual reality computing systems (including multiple different VR computing systems) that is facilitated using virtual reality and augmented reality headsets. However, detection of targeted images within virtual reality computing systems poses additional problems, since navigation to static network computing environments, such as websites, is not evident within virtual reality environments.

Therefore, a need exists to develop systems, methods, computer program products and the like which provides a robust and efficient means for detecting targeted images within various computing networks, such as the Internet and virtual-reality-based computing networks, such as the Metaverse. In this regard, the desired systems, methods, computer program products and the like should overcome obstacles presented by the fact that the images displayed within a website and/or a virtual computing environment may periodically change over time. Moreover, the desired systems, methods, computer program products should be capable of detecting images that are slight variations of the targeted image (e.g., images that have intentionally altered for purposes of avoiding automated image detection techniques).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a comprehensive system for detecting targeted images, as well as variations thereof within computing networks, such as the Internet and the Metaverse. In terms of the Internet, the system navigates to predetermined websites and accesses the HyperText Markup Language (HTML) code (commonly referred to as the "page source") to search for image file extensions within the listing of Universal Resource Locators (URLs). In response to finding URLs with image file extensions, the hyperlink is activated to navigate to the webpage containing the associated image and the image is downloaded for purposes of target image detection analysis. In specific embodiments of the invention, the system may additionally search for video file extensions within the listing of URLs found within the HTML code and, in response to activating the associated hyperlink, navigate to a webpage presenting/histing the video content. Subsequently, the video content is downloaded for subsequent target image detection analysis.

In other embodiments of the invention, a virtual surveillance drone is deployed within virtual reality computing systems to navigate the entirety of the virtual reality environment to search for images that may be displayed and, more specifically, images that appear to match or resemble the targeted image. The drone is capable of capturing the images and communicating the images to non-virtual computing systems for purposes of target image detection analysis. In additional embodiments, the drone may be configured to search for videos that may be running in the virtual reality environment and, more specifically videos that appear to include image(s) that appear to match or resemble the targeted image. In such embodiments, the drone is capable of capturing the videos and communicating the videos to non-virtual computing systems for purposes of target image detection analysis According to embodiments of the present invention, targeted image detection analysis provides for initially implementing machine learning techniques to learn patterns of variance associated with the target images. Patterns of variance include how the image is or may be altered, such as changes in color, clarity, dimensions, and the like. Once the patterns of variance have been determined, the image detection analysis involves comparing the images downloaded from the website to the actual targeted images and the patterns of variance to determine if a match exists. If a match exists, the downloaded image is tagged as an image of interest (e.g., likely unauthorized and/or improper use). For purposes of video analysis, each frame of a video is analyzed for inclusion of one or more images and the images therein are extracted for subsequent comparison analysis.

In specific embodiments of the invention, the predetermined websites that are navigated to for image detection and/or the priority/order for navigation are determined based on criteria such, website type, domain name or the like. For example, when the goal of image detection is protecting against unauthorized use of a logo and/or brand mark, the website determination or priority may be based on the business nature of the website or how closely the domain name resembles the entity holding the logo and/or brand mark. In other embodiments, machine-learning may be implemented to learn, over time, which websites and/or types of websites have or are likely to display unauthorized images. In specific embodiments of the invention, a search of the text data displayed on websites may be performed to determine which websites reference the entity holding the logo and/or brand mark and those websites may form the predetermined websites and/or be prioritized in the order in which the websites are searched.

In further specific embodiments of the invention, in which the image detection is being performed to protecting against unauthorized use of a logo, once an image has been tagged as an image of interest (e.g., likely unauthorized and/or improper use, the system may implement automated unauthorized use inquiry communication to the website owner or the like. In specific instances, the system navigates to the website at which the image is being displayed and searches for appropriate contact information and/or searches in a who-is lookup registrar for the owner of the website. In response to determining contact information and/or website owner information, a correspondence inquiring as to the authorization of the use of the image is generated and communicated to entity/website.

As such the systems, methods, computer program products and the like here discussed provide for a robust and effective means for ensuring that any image of interest that is posted at a website or displayed within a virtual reality environment is capable of detection and, where applicable, appropriate actions, such as remedying unauthorize use, are taken.

A system for automated targeted digital image detection within computing networks defines first embodiments of the invention. The system includes at least one computing platform having a memory and one or more computing device processors in communication with the memory. In addition, the system includes image variation learning instructions that are stored in the memory and executable by at least one of the computing device processors. The instructions are configured to receive an image file comprising one or more targeted digital images. The digital images may include, but are not limited to, images of (i) logos or brand markings, or (ii) an individual(s). The instructions are further configured to implement machine-learning techniques to determine patterns of variance for each of the one or more targeted digital images and store the one or more targeted digital images and corresponding patterns of variance in a database.

The system additionally includes image searching and capturing instructions that are stored in the memory and executable by at least one of the computing device processors. The instructions are configured to automatically navigate to predetermined websites, and, at each of the predetermined websites, access HyperText Markup Language (HTML) code and search the HTML code for hyperlinks including an image file extension. The instructions are further configured to, for each hyperlink that includes an image file extension, activate the hyperlink to navigate to a webpage depicting an online digital image associated with the corresponding image file extension, and download the online digital image.

Further, the system includes image analysis instructions that are executable by at least one of the third computing devices. The instructions are configured to receive the downloaded online digital images and access the image variance database to compare the downloaded online digital images to the targeted digital images and the patterns of variance. In response to determining a match between a least one of the online digital images and at least one of (i) at least one the targeted digital images, and (ii) at least one of the patterns of variance associated with one of the targeted digital images, the instructions are further configured to tag the at least one of the online digital images for potential unauthorized use.

In alternate embodiments the system further includes a virtual surveillance drone application configured to be deployed and executed within one or more virtual reality computing environments. The virtual surveillance drone instructions are configured to continuously navigate the one or more virtual reality computing environments and search for virtual images that potentially match the at least one of (i) at least one the targeted digital images, and (ii) at least one of the patterns of variance associated with one of the targeted digital images. In response to determining that at least one virtual image potentially matches the at least one of (i) at least one the targeted digital images, and (ii) at least one of the patterns of variance associated with one of the targeted digital images, the instructions are configured to capture the at least one virtual image. In response to capturing the least one virtual image, the image analysis instructions are further configured to analyze the at least one virtual image to confirm or deny that each of the at least one virtual image matches the at least one of (i) at least one the targeted digital images, and (ii) at least one of the patterns of variance associated with one of the targeted digital images.

In other embodiments of the system, the image searching and capturing instructions are further configured to, at each of the predetermined websites, access the HTML code and search the HTML code for HTML elements that comprise a hyperlink including a video file extension. For each HTML element that comprises the hyperlink including the video file extension, the instructions are configured to activate the hyperlink to navigate to a second webpage presenting an online digital video associated with the corresponding video file extension and download the online digital video to the image analysis instructions. In related embodiments of the system, the image analysis instructions are further configured to receive the downloaded online digital videos, capture each frame of the online digital videos, and for each captured frame, access the image variance database and compare images in the captured frame to the targeted digital images and the patterns of variance. In response to determining a match between a least one of the images in the captured frame and at least one of (i) at least one the targeted digital images, and (ii) at least one of the patterns of variance associated with one of the targeted digital images, the instructions are configured to tag the at least one of the images in the captured frame for potential unauthorized use.

In further specific embodiments the system includes a website priority determining application that is stored in the memory and executable by at least one of the computing devices. The instructions are configured to determine at least one of (i) the predetermined websites, and (ii) a prioritization for execution of the image searching and capturing instructions at the predetermined websites. In specific embodiments of the system, the determination is based at least on one of (a) website type, and (b) domain name. In further related embodiments of the system the website priority determining application is configured to determine at least one of (i) the predetermined websites, and (ii) a prioritization for execution of the image searching and capturing instructions at the predetermined websites by implementing machine-learning techniques that use results of previous executions of the image searching and capturing instructions and the image analysis instructions as input data. In still further related embodiments of the system, the website priority determining application is configured to determine at least one of (i) the predetermined websites, and (ii) a prioritization for execution of the image searching and capturing instructions at the predetermined websites by conducting text searches within websites for text related to the targeted digital images, and, in response to determining that one or more of the websites include text related to the targeted digital images, performing at least one chosen from group consisting of (i) adding the one or more of the websites to a list of the predetermined website and/or (ii) prioritizing the execution of the image searching and capturing instructions at the one or more of the websites. In further related embodiments of the system, the website priority determining application is further configured to exclude from the predetermined websites those websites authorized to depict the one or more targeted digital images.

Moreover, in further embodiments the system includes an unauthorized use inquiry communication generator application that is stored in the memory and executable by at least one of the computing devices. In response to tagging the at least one of the online digital images for potential unauthorized use, the instructions are configured to automatically perform at least one chosen from group consisting of (i) navigate to websites at which the at least one of the online digital images were downloaded and search for contact information associated with the websites and (ii) navigate to a lookup registrar to determine an entity associated with the websites. The instructions are further configured to generate, and initiate communication of, an unauthorized digital image use inquiry based on at least one chosen from the group consisting of (i) the contact information and (ii) the entity.

A computer-implementing method for automated targeted digital image detection within computing networks defines second embodiments of the invention. The method is executed by one or more computing processor devices. The method includes implementing machine-learning techniques to determine patterns of variance for each of one or more targeted digital images and storing the one or more targeted digital images and corresponding patterns of variance in a database. The method further includes automatically navigating to predetermined websites, accessing HyperText Markup Language (HTML) code at the predetermined websites and searching the HTML code for HTML elements that comprise a hyperlink including an image file extension. For each HTML element that comprises the hyperlink including an image file extension, the method further includes activating the hyperlink to navigate to a webpage depicting an online digital image associated with the corresponding image file extension and downloading the online digital image. Further, the method includes accessing the database and comparing the downloaded online digital images to the targeted digital images and the patterns of variance, and, in response to determining a match between a least one of the downloaded online digital images and at least one of (i) at least one the targeted digital images, and (ii) at least one of the patterns of variance associated with one of the targeted digital images, tagging the at least one of the downloaded online digital images for potential unauthorized use.

In further embodiments the computer-implemented method includes deploying and executing a virtual surveillance drone in one or more virtual computing environments to continuously navigate the one or more virtual reality computing environments and search for virtual images that potentially match the at least one of (i) at least one the targeted digital images, and (ii) at least one of the patterns of variance associated with one of the targeted digital images. In response to determining that at least one virtual image potentially matches the at least one of (i) at least one the targeted digital images, and (ii) at least one of the patterns of variance associated with one of the targeted digital images, the computer-implemented method further includes capturing the at least one virtual image and analyzing the captured at least one virtual image to confirm or deny that each of the at least one virtual image matches the at least one of (i) at least one the targeted digital images, and (ii) at least one of the patterns of variance associated with one of the targeted digital images.

In other specific embodiments the computer-implemented method includes, at each of the predetermined websites, accessing the HTML code and searching the HTML code for hyperlinks including a video file extension and, for each of the hyperlinks including the video file extension, activating the hyperlink to navigate to a second webpage presenting an online digital video associated with the corresponding video file extension and downloading the online digital video. The computer-implemented method further including capturing each frame of the online digital videos and, for each captured frame, accessing the image variance database and comparing images in the captured frame to the targeted digital images and the patterns of variance. In response to determining a match between a least one of the images in the captured frame and at least one of (i) at least one the targeted digital images, and (ii) at least one of the patterns of variance associated with one of the targeted digital images, tagging the at least one of the images in the captured frame for potential unauthorized use.

In still further embodiments the computer-implemented method includes determining at least one chosen from the group consisting of (i) the predetermined websites, and (ii) a prioritization for navigating to the predetermined websites.

Additionally, in further specific embodiments the computer-implemented method includes, in response to tagging the at least one of the second digital images for potential unauthorized use, automatically performing at least one chosen from group consisting of (i) navigate to websites at which the at least one of the second digital images were downloaded and search for contact information associated with the websites and (ii) navigate to a lookup registrar to determine an entity associated with the websites, and generating, and initiating communication of, an unauthorized digital image use inquiry based on at least one chosen from the group consisting of (i) the contact information and (ii) the entity.

A computer program product including a non-transitory computer-readable medium defines third embodiments of the invention. The computer-readable medium includes sets of codes. The sets of codes cause one or more computing processing devices to implement machine-learning techniques to determine patterns of variance for each of one or more targeted digital images and store the one or more targeted digital images and corresponding patterns of variance in a database. The sets of codes further cause the computer processing device(s) to automatically navigate to predetermined websites, access HTML code at the predetermined websites and search the HTML code for hyperlink including an image file extension. In addition, the sets of codes cause the computer processing device(s) to, for each HTML element that comprises the hyperlink including an image file extension, activate the hyperlink to navigate to a webpage depicting an online digital image associated with the corresponding image file extension and downloading the online digital image. Further, the sets of codes further cause the computer processing device(s) to access the database and compare the downloaded online digital images to the targeted digital images and the patterns of variance, and in response to determining a match between a least one of the downloaded online digital images and at least one of (i) at least one the targeted digital images, and (ii) at least one of the patterns of variance associated with one of the targeted digital images, tag the at least one of the downloaded online digital images for potential unauthorized use.

In specific embodiments of the computer program product, the sets of codes further include a sets of codes for causing the one or computing processor devices to deploy and execute a virtual surveillance drone in one or more virtual computing environments to continuously navigate the one or more virtual reality computing environments and search for virtual images that potentially match the at least one of (i) at least one the targeted digital images, and (ii) at least one of the patterns of variance associated with one of the targeted digital images. In response to determining that at least one virtual image potentially matches the at least one of (i) at least one the targeted digital images, and (ii) at least one of the patterns of variance associated with one of the targeted digital images, the sets of codes further cause computing processor device(s) to capture the at least one virtual image and analyze the captured at least one virtual image to confirm or deny that each of the at least one virtual image matches the at least one of (i) at least one the targeted digital images, and (ii) at least one of the patterns of variance associated with one of the targeted digital images.

In further specific embodiments of the computer program product, the sets of codes further include sets of codes for causing the one or more computing processing devices to, at each of the predetermined websites, access the HTML code and search the HTML code for hyperlinks including a video file extension and for each hyperlink including the video file extension, activate the hyperlink to navigate to a second webpage presenting an online digital video associated with the corresponding video file extension and download the online digital video. In such embodiments of the computer program product, the sets of codes further cause the computing processing device(s) to capture each frame of the online digital videos and, for each captured frame, access the image variance database and comparing images in the captured frame to the targeted digital images and the patterns of variance, and, in response to determining a match, tag the at least one of the images in the captured frame for potential unauthorized use.

Moreover, in further embodiments of the computer program product, the sets of codes further include a set of codes for causing the computing processing device(s) to determine at least one chosen from the group consisting of (i) the predetermined websites, and (ii) a prioritization for navigating to the predetermined websites.

Thus, according to embodiments of the invention, which will be discussed in greater detail below, the present invention provides for a comprehensive system for detecting targeted images, as well as variations thereof within computing networks, such as the Internet and the Metaverse. In terms of the Internet, the system navigates to predetermined websites and accesses the HTML code to search for image file extensions and in some instances video file extensions within the listing of URLs. In response to finding URLs with image or video file extensions, the hyperlink is activated to navigate to the webpage containing the associated image and the image is downloaded for purposes of target image detection analysis. Additionally, a virtual surveillance drone is deployed within virtual reality computing systems to navigate the entirety of the virtual reality environment and search for images that may be displayed and, more specifically, images that appear to match or resemble the targeted image. The drone is capable of capturing the images and communicating the images to non-virtual computing systems for purposes of target image detection analysis. Targeted image detection analysis provides for initially implementing machine learning techniques to learn patterns of variance associated with the target images. Once the patterns of variance have been determined, the image detection analysis involves comparing the images downloaded from the website or captured in the virtual reality computing environment to the actual targeted images and the patterns of variance to determine if a match exists.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
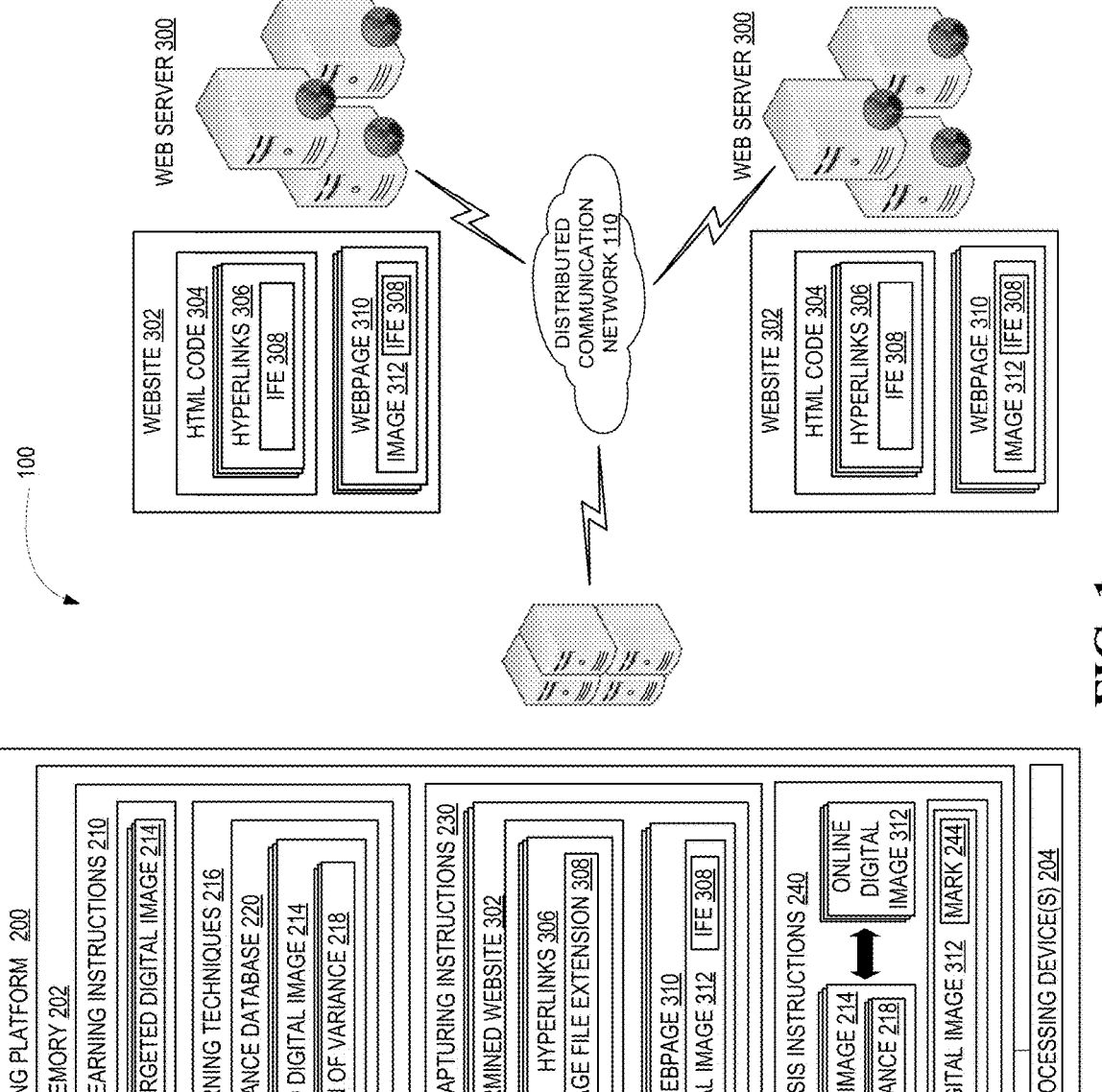
Figure 2:
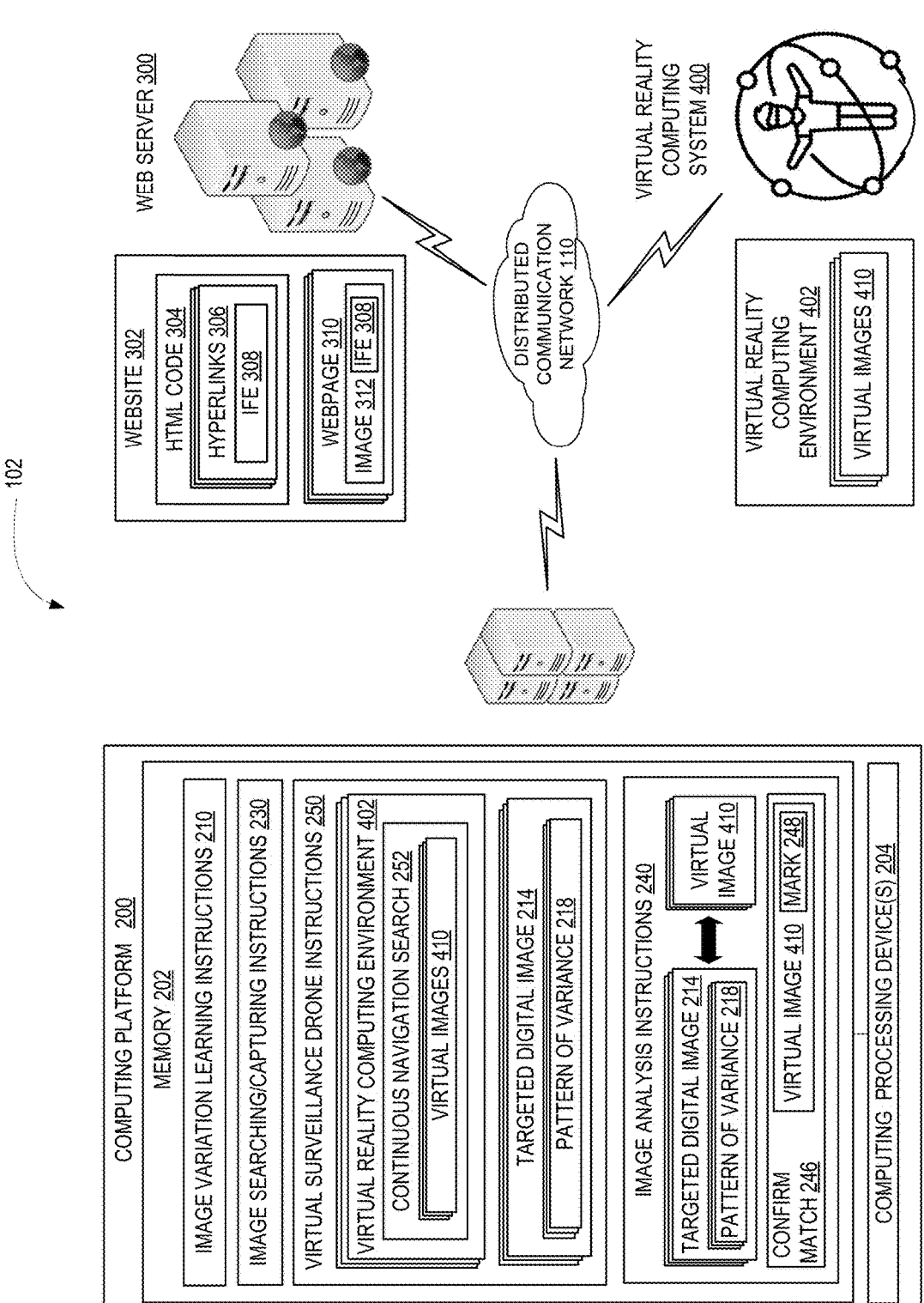
Figure 3:
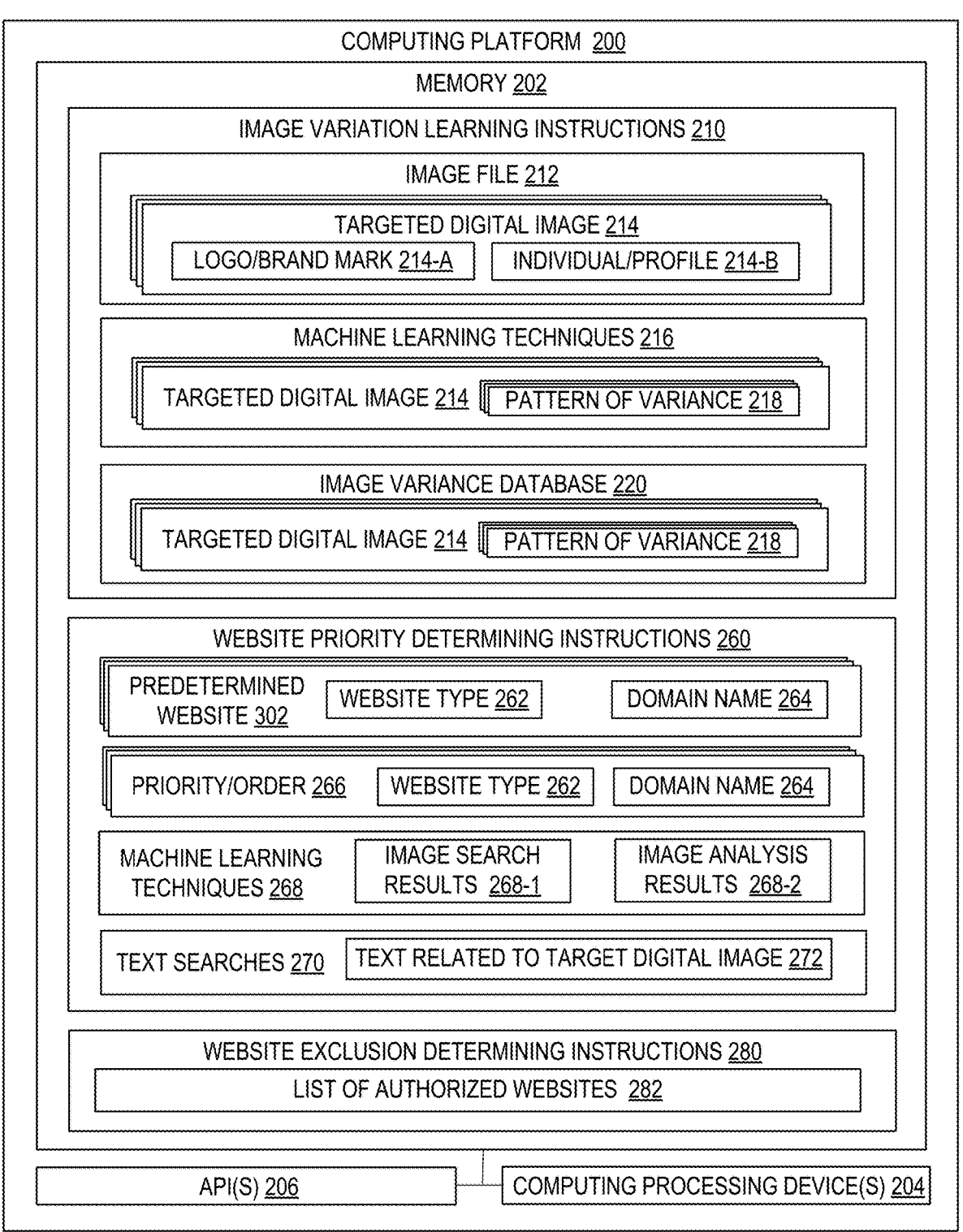
Figure 4:
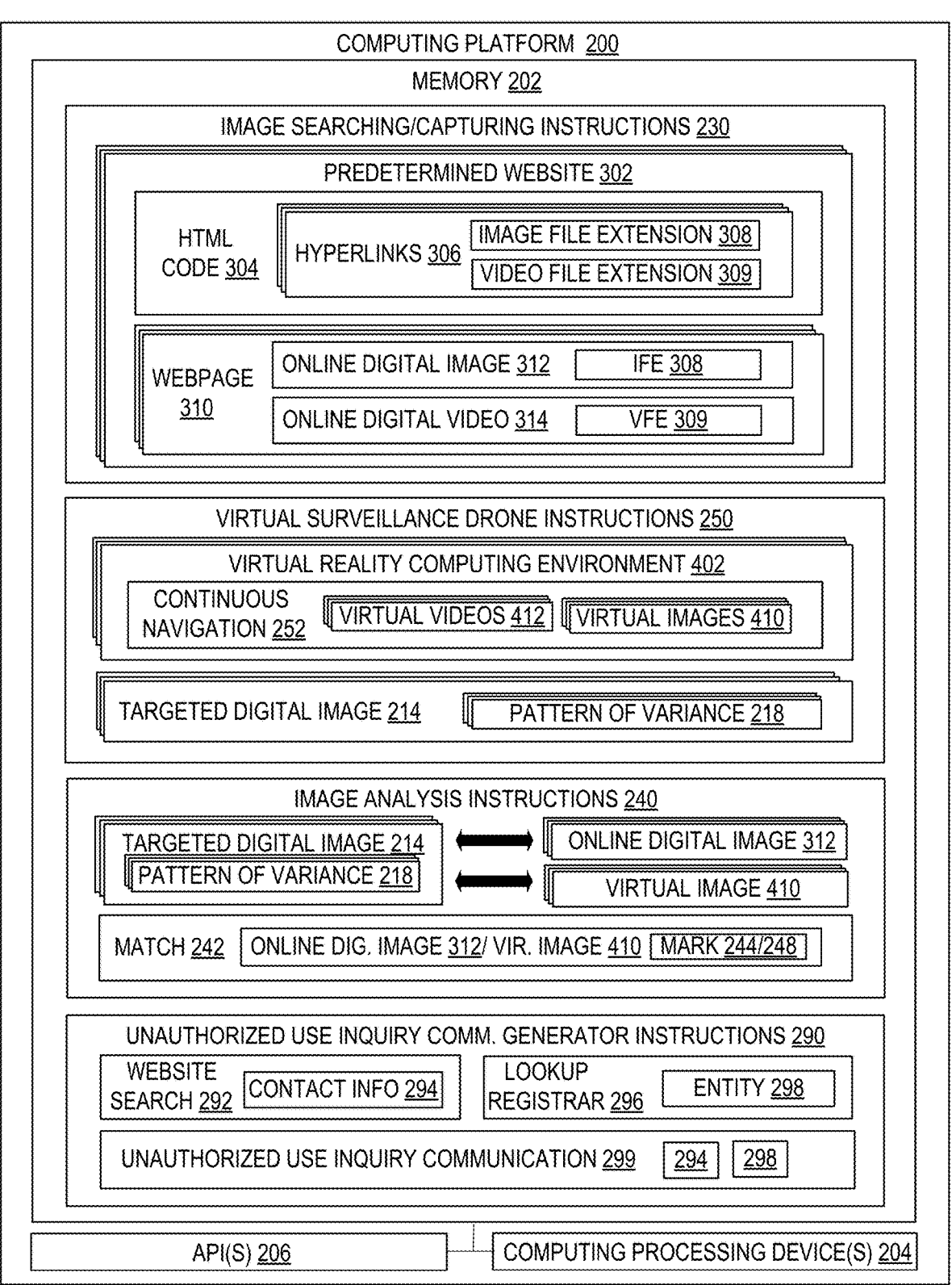
Figure 5:
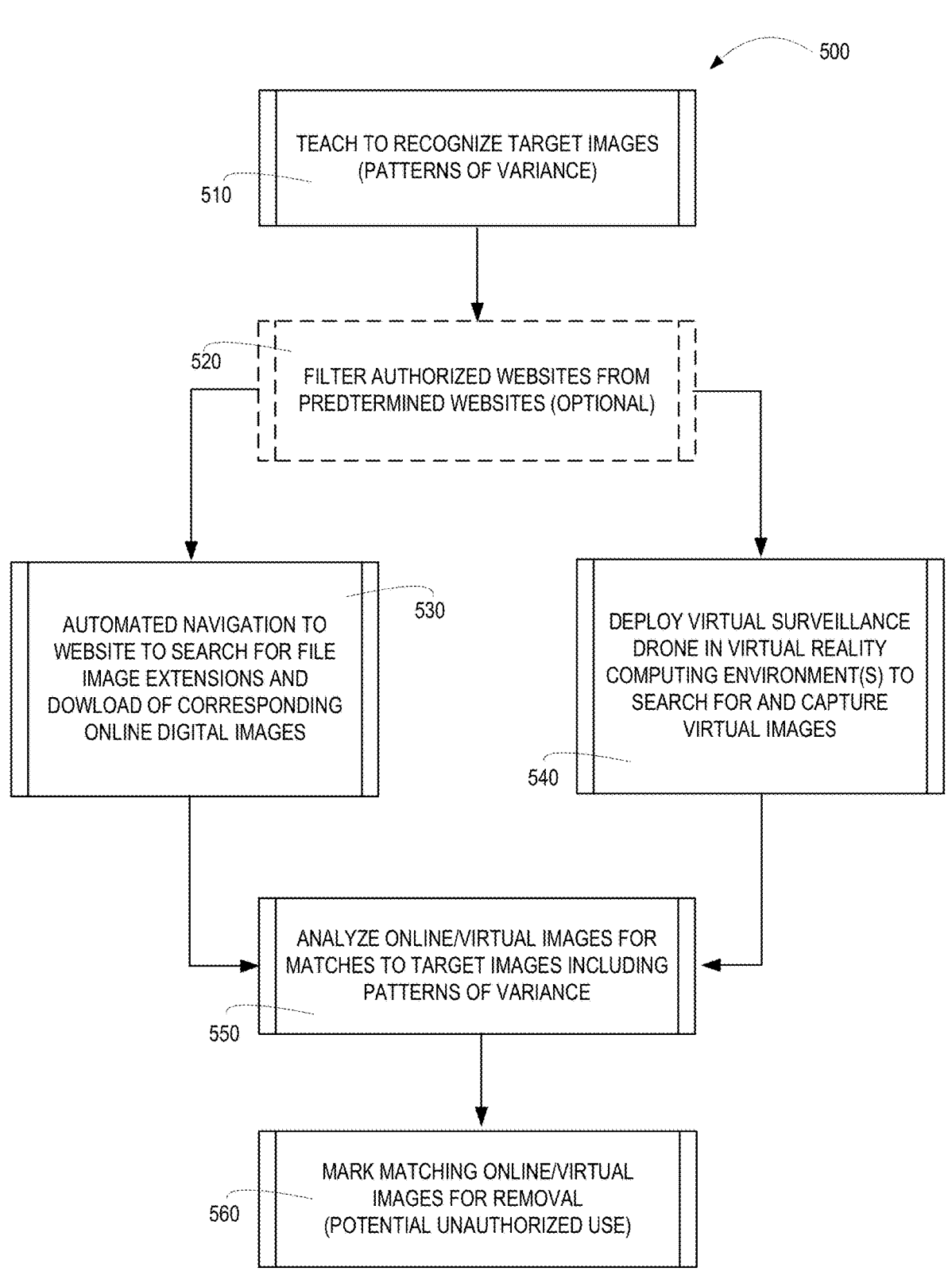

Having thus described embodiments of the disclosure in general terms, reference will now be made to the accompanying drawings, wherein:

FIG. 1 is a schematic/block diagram of system for detecting targeted images within the Internet, in accordance with embodiments of the present invention;

FIG. 2 is a schematic/block diagram of system for detecting targeted images within the Internet and virtual reality computing systems, in accordance with embodiments of the present invention;

FIGS. 3 and 4 are block diagrams of a computing platform configured for detecting targeted images within computing networks, in accordance with embodiments of the present invention; and FIG. 5 is a high-level flow diagram of a method for detecting targeted images within the Internet and virtual reality computing systems, in accordance with embodiments of the present invention; and FIG. 6 is a flow diagram of a method for detecting targeted images within a computing network, such as the Internet, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing computer-executable program code embodied in computer-readable medium, and/or by having one or more application-specific circuits perform the function.

As used herein, "virtual reality computing system", which includes augmented reality computing systems, such as the Metaverse or the like may refer to a collection of persistent, shared, three-dimensional virtual spaces linked into a perceived virtual universe. In some embodiments, a virtual reality computing systems may not only refer to virtual worlds, but the Internet as a whole, including the spectrum of augmented reality. A virtual reality computing environment may include a number of different elements such as video conferencing, digital currencies, virtual reality platforms, social media, live data streaming, digital representations of real-life objects and/or the like. In some embodiments, a virtual reality computing environment may include virtual properties, such as virtual land parcels and estates for users to create and build-on, or structures that reflect real-life properties and/or completely original creations. These spaces may be represented by co-ordinates on the metaverse platform where users can meet up using their avatars (i.e., virtual objects) to socialize and decorate their own spaces with collectibles. Any combination of the aforementioned elements may form a computer-mediated virtual environment, i.e., a virtual world, within the metaverse. Within this self-sustaining, persistent, and shared realm, users may exist and interact with each other using their digital avatars (i.e., virtual objects).

Thus, according to embodiments of the invention, which will be described in more detail below, systems, methods and computer program products are disclosed that provide for a comprehensive system for detecting targeted images, as well as variations thereof within computing networks, such as the Internet and the Metaverse. In terms of the Internet, the system navigates to predetermined websites and accesses the HyperText Markup Language (HTML) code (commonly referred to as the "page source") to search for image file extensions within the listing of Universal Resource Locators (URLs). In response to finding URLs with image file extensions, the hyperlink is activated to navigate to the webpage containing the associated image and the image is downloaded for purposes of target image detection analysis. In specific embodiments of the invention, the system may additionally search for video file extensions within the listing of URLs found within the HTML code and, in response to activating the associated hyperlink, navigate to a webpage presenting/histing the video content. Subsequently, the video content is downloaded for subsequent target image detection analysis.

In other embodiments of the invention, a virtual surveillance drone is deployed within virtual reality computing systems to navigate the entirety of the virtual reality environment to search for images that may be displayed and, more specifically, images that appear to match or resemble the targeted image. The drone is capable of capturing the images and communicating the images to non-virtual computing systems for purposes of target image detection analysis. In additional embodiments, the drone may be configured to search for videos that may be running in the virtual reality environment and, more specifically videos that appear to include image(s) that appear to match or resemble the targeted image. In such embodiments, the drone is capable of capturing the videos and communicating the videos to non-virtual computing systems for purposes of target image detection analysis According to embodiments of the present invention, targeted image detection analysis provides for initially implementing machine learning techniques to learn patterns of variance associated with the target images. Patterns of variance include how the image is or may be altered, such as changes in color, clarity, dimensions and the like. Once the patterns of variance have been determined, the image detection analysis involves comparing the images downloaded from the website to the actual targeted images and the patterns of variance to determine if a match exists. If a match exists, the downloaded image is tagged as an image of interest (e.g., likely unauthorized and/or improper use). For purposes of video analysis, each frame of a video is analyzed for inclusion of one or more images and the images therein are extracted for subsequent comparison analysis.

In specific embodiments of the invention, the predetermined websites that are navigated to for image detection and/or the priority/order for navigation are determined based on criteria such, website type, domain name or the like. For example, when the goal of image detection is protecting against unauthorized use of a logo and/or brand mark, the website determination or priority may be based on the business nature of the website or how closely the domain name resembles the entity holding the logo and/or brand mark. In other embodiments, machine-learning may be implemented to learn, over time, which websites and/or types of websites have or are likely to display unauthorized images. In specific embodiments of the invention, a search of the text data displayed on websites may be performed to determine which websites reference the entity holding the logo and/or brand mark and those websites may form the predetermined websites and/or be prioritized in the order in which the websites are searched.

In further specific embodiments of the invention, in which the image detection is being performed to protecting against unauthorized use of a logo, once an image has been tagged as an image of interest (e.g., likely unauthorized and/or improper use, the system may implement automated unauthorized use inquiry communication to the website owner or the like. In specific instances, the system navigates to the website at which the image is being displayed and searches for appropriate contact information and/or searches in a who-is lookup registrar for the owner of the website. In response to determining contact information and/or website owner information, a correspondence inquiring as to the authorization of the use of the image is generated and communicated to entity/website.

Referring to FIG. 1, a schematic/block diagram is presented of a system 100 for detecting targeted images within a computing network, such as the Internet, in accordance with embodiments of the invention. The system 100 is implemented within a distributed communication network 110, which may include the Internet, one or more intranets, one or more cellular networks or the like. The system 100 includes a computing platform 200. Computing platform 200 includes a memory 202 and one or more computing processing devices 204 in communication with memory 202.

Memory 202 stores image variation learning instructions 210 that are executable by computing processing device(s) 204 and configured to receive an image file 212 that comprises one or more targeted digital images 214. The term "targeted" as used herein refers to any image that a user seeks to identify via a search of a computing network, such as the Internet. For example, a targeted digital image 214 may be a logo or brand mark of a business or organization or a photograph of a person of interest. In response to receiving image file 212, image variation learning instructions 210 is configured to implement machine-learning techniques 216 (i.e., artificial intelligence) to determine patterns of variance 218 for each of the one or more targeted digital images 214. The patterns of variance 218 may take the form of alteration in color, contrast, shading, clarity, dimensions, distortion and the like. Inputs to the machine-learning instructions may include results of previous searches for targeted images (i.e., how targeted images have previously been altered). In response to determining the patterns of variance, image variation learning instructions 210 is further configured to store the targeted digital images 214 and corresponding patterns of variance 218 in a targeted image and image variance database 220.

Memory 204 additionally stores image searching and capturing instructions 230 that are executable by computing processing device(s) 204 and configured to automatically navigate to predetermined websites 302 stored within web-servers 300 or the like and, at each website 302, access HyperText Markup Language (HTML) code for each webpage of the website 302 and search for hyperlinks 306 that include an image file extension 308 (e.g., .jpeg, .tiff, .png, .gif, .pdf and the like). For each hyperlink 306 that includes an image file extension 308, image searching and capturing instructions 230 are further configured to activate the hyperlink 306 to navigate to the webpage 310 depicting the online digital image 312 associated with the corresponding image file extension 308 and download the online digital image 312 to image analysis instructions 240.

Further, memory 202 stores image analysis instructions 240 that are executable by computing processing device(s) 204 and configured to receive the downloaded online digital images 312 and access the database 220 to compare the online digital images 312 to the targeted digital images 214 and the patterns of variance 218. In response to the comparison resulting in a match 242 between at least one of the of the online digital images 312 and a targeted digital image 214 and/or a pattern of variance 218, the image analysis instructions 240 are further configured to tag/mark 244 the online digital image 312 as subject to possible removal from the website 302 at which the online digital image 312 was found/downloaded from. Removal is required if a subsequent confirmation is made that the website is using the image without consent (i.e., unauthorized use) or is otherwise using the image for an illegal of nefarious purpose.

Referring to FIG. 2 a schematic/block diagram is presented of a system 102 for detecting targeted images within computing networks, such as the Internet and virtual reality computing systems, in accordance with embodiments of the invention. Similar to the embodiments described in relation to FIG. 1, computing platform 200 includes memory 202 that stores image variation learning instructions 210 and image searching and capturing instructions 230, the functionality of which are the same as those described in relation to the embodiments shown in FIG. 1.

Memory 202 of computing platform 200 additionally includes virtual surveillance drone instructions 250 that are configured to be deployed and executed by the computing processing devices 204 within one or more virtual reality computing systems 400, including augmented reality computing systems, such as the Metaverse or the like. Once deployed, virtual surveillance drone instructions 250 are configured to continuously navigate 252 one or more virtual reality computing environments 402 and search for, and capture, virtual images 410 displayed within the environments 402. The captured virtual images 410 are subsequently communicated to the image analysis instructions 240. In specific embodiments of the system, the surveillance drone instructions 250 are configured to search for virtual images 410 that potentially match the targeted digital images 214 and/or the patterns of variance 218 associated with the targeted digital images 214. In such embodiments of the system, in response to determining that one or more virtual images 410 potentially match one of the targeted digital images 214 and/or one of the patterns of variance 218 for a targeted digital image 214, the virtual image 410 is captured and communicated to the image analysis instructions 240.

In response to receiving a virtual image(s) 410, image analysis instructions 240 are configured to access database 220 and compare the virtual image(s) 410 to the targeted digital images 214 and the patterns of variance 218. In response to the comparison resulting in a match 242 between at least one of the of the virtual images 410 and a targeted digital image 214 and/or a pattern of variance 218, the image analysis instructions 240 are further configured to tag/mark 248 the virtual image 312 as subject to possible removal from the virtual reality computing system 400 at which the virtual image 410 was found. Removal is required if a subsequent confirmation is made that the virtual reality computing system is using the image without consent (i.e., unauthorized use) or is otherwise using the image for an illegal of nefarious purpose. In specific embodiments of the system, in which the image analysis instructions 240 receives virtual images 410 that potentially match one of the targeted digital images 214 and/or one of the patterns of variance 218, the image analysis instructions 240 is further configured to confirm or deny that each of the virtual images 410 match 246 between the virtual image(s) 410 and a targeted digital image 214 and/or a pattern of variance 218. In response to confirming the match 246 between at least one of the of the virtual images 410 and a targeted digital image 214 and/or a pattern of variance 218, the image analysis instructions 240 are further configured to tag/mark 248 the virtual image 312 as subject to possible removal from the virtual reality computing system 400 at which the virtual image 410 was found.

Referring to a FIGS. 3 and 4, block diagrams are presented of computing platform 200, which may comprise one or multiple devices, such as application servers, laptops, or the like. Computing platform 200 includes memory 202, which may comprise volatile and/or non-volatile memory, such as read-only and/or random-access memory (RAM and ROM), EPROM, EEPROM, flash cards, or any memory common to computing platforms). Moreover, memory 202 may comprise cloud storage, such as provided by a cloud storage service and/or a cloud connection service.

Further, computing platform 200 includes one or more computing processing devices 204, which may be an application-specific integrated circuit ("ASIC"), or other chipset, logic circuit, or other data processing device. Computing processing device(s) 204 may execute one or more application programming interface (APIs) 206 that interface with any resident programs, such as virtual reality application 310, authentication application 330, access control application 360 or the like, stored in memory 210 of computing platform 200 and any external programs. Computing processing devices(s) 204 may include various processing subsystems (not shown in FIGS. 2 and 3) embodied in hardware, firmware, software, and combinations thereof, that enable the functionality of computing platform 200 and the operability of computing platform 200 on a distributed communication network 110 (shown in FIG. 1), such as the Internet, intranet(s), cellular network(s), and the like. For example, processing subsystems allow for initiating and maintaining communications and exchanging data with other networked devices. For the disclosed aspects, processing subsystems of computing platform 200 may include any subsystem used in conjunction with image variation learning instructions 210, image searching/capturing instructions 230, image analysis instructions 240, virtual surveillance drone instructions 250, website and priority determining instructions 260, website exclusion determining instructions 280 and unauthorized use inquiry communication generator instructions 290 and related tools, routines, sub-routines, algorithms, sub-algorithms, sub-modules thereof.

In specific embodiments of the present invention, computing platform 200 additionally includes a communications module (not shown in FIGS. 3 and 3) embodied in hardware, firmware, software, and combinations thereof, that enables electronic communications between computing platform 200 and other networks and network devices, such as web servers 300 and virtual reality computing systems 400. Thus, communication module may include the requisite hardware, firmware, software and/or combinations thereof for establishing and maintaining a network communication connection with one or more devices and/or networks.

As previously discussed, memory 210 of computing platform 200 stores image variation learning instructions 210 that are executable by computing processing device(s) 204 and configured to receive an image file 212 that comprises one or more targeted digital images 214. For example, a targeted digital image 214 may be a logo or brand mark 214-A of a business or organization or a photograph of an individual 214-B of interest. In response to receiving image file 212, image variation learning instructions 210 is configured to implement machine-learning techniques 216 (i.e., artificial intelligence) to determine patterns of variance 218 for each of the one or more targeted digital images 214. The patterns of variance 218 may take the form of alteration in color, contrast, shading, clarity, dimensions, distortion and the like. Inputs to the machine-learning instructions may include results of previous searches for targeted images (i.e., how targeted images have previously been altered). In response to determining the patterns of variance, image variation learning instructions 210 is further configured to store the targeted digital images 214 and corresponding patterns of variance 218 in a targeted image and image variance database 220.

In alternate embodiments of the invention, memory 202 of computing platform 200 additionally stored website and priority determining instructions 250 that are executable by one or more of the computing processing devices 204 and configured to determine the predetermined websites 302 and/or a priority/order 256 for navigating to and searching the websites 256 based on website type 252 (e.g., business websites) and/or domain name 254 (e.g., variations of the name of the entity associated with the logo/brand mark). In other embodiments of the invention, artificial intelligence (AI) including machine learning (ML) techniques 258 are implemented to determine the predetermined websites 302 and/or a priority/order 256 for navigating to and searching the websites 256. In such embodiments of the invention, previous website search results 258-1 and/or previous image analysis results 258-2 are used as at least a portion of the inputs to the machine-learning models. In further specific embodiments of the invention, determining the predetermined websites 302 and/or a priority/order 256 for navigating to and searching the websites 256 includes conducting text searches 260 of websites for text related 262 to the targeted digital images 214, such as the name of the entity holding rights in the logo or brand mark(s) or the name of the individual of interest and, in response to determining that one or more of the websites at which the text searches 260 occurred returned text related 262 to the targeted digital image(s) 214, adding those websites to the list of predetermined websites 302 and/or prioritizing execution of the image search and capture instructions 230 at those websites.

In further alternate embodiments of the invention, memory 202 stores website exclusion determining instructions 270 that are executable by at least one of the computing processing devices 204 and are configured to exclude from the predetermined websites 302 any website currently listed on list of authorized websites 272 (i.e., websites that have been authorized to use one or more of the targeted digital images 214).

Referring to FIG. 4, as previously discussed, image searching and capturing instructions 230 that are executable by computing processing device(s) 204 and configured to automatically navigate to predetermined websites 302 and, at each website 302, access HyperText Markup Language (HTML) code for each webpage of the website 302 and search for hyperlinks 306 that include an image file extension 308 (e.g., .jpeg, .tiff, .png, .gif, .pdf and the like) and, in some embodiments hyperlinks 306 that include a video file extension 309 (e.g., .mpeg, .mp4, .mov, .avi and the like) For each hyperlink 306 that includes an image file extension 308 or, in some embodiments, a video file extension 309, image searching and capturing instructions 230 are further configured to activate the hyperlink 306 to navigate to the webpage 310 depicting the online digital image 312 or presenting the online digital video 314 associated with the corresponding image file extension 308 or video file extension 309 and download the online digital image 312 or online digital video 314 to image analysis instructions 240.

In additional specific embodiments of the invention, memory 202 stores virtual surveillance drone instructions 250 that are configured to be deployed and executed by the computing processing devices 204 within one or more virtual reality computing systems 400, including augmented reality computing systems, such as the Metaverse or the like. Once deployed, virtual surveillance drone instructions 250 are configured to continuously navigate 252 one or more virtual reality computing environments 402 and search for, and capture, virtual images 410 displayed within the environments 402 and, in some embodiments virtual videos 412 presented within the environments 402. The captured virtual images 410 and/or virtual videos 412 are subsequently communicated to the image analysis instructions 240. In specific embodiments of the system, the surveillance drone instructions 250 are configured to search for virtual images 410 (or images within the virtual videos 412) that potentially match the targeted digital images 214 and/or the patterns of variance 218 associated with the targeted digital images 214. In such embodiments of the system, in response to determining that one or more virtual images 410 potentially match one of the targeted digital images 214 and/or one of the patterns of variance 218 for a targeted digital image 214, the virtual image 410 is captured and communicated to the image analysis instructions 240 for further analysis.

In further specific embodiments of the invention, memory 204 includes unauthorized use inquiry communication generator instructions 290 that are executable by one or more of the computing processor devices 204 and configured to, in response to tagging/marking an online digital image 312, or online digital video 314 for potential removal, navigate to the website that the online digital image 312 was found and search 292 for contact information 294 associated with the website controlling entity and/or navigate to a lookup registrar to search for the entity 298 associated with the website. In response, unauthorized use inquiry communication generator instructions 290 is further configured to generate, and initiate communication of, an unauthorized use inquiry communication 299 based at least one the contact information 292 and/or the entity 298 associated with the website.

Referring to FIG. 5, a flow diagram is depicted of a method for detecting targeted images in computing networks, in accordance with embodiments of the present invention. At Event 510, target images including patterns of variance for the targeted images are taught and stored in memory. The teaching, which may incorporate machine-learning techniques or the like, occurs over time and may be based on previous conducted targeted image searches and the like. At Event 520, authorized websites are filtered out/excluded from the list of predetermined websites. Authorized websites are websites that have been granted permission to use the targeted images by the entity holding the rights in the targeted images.

At Event 530, navigation to the predetermined websites occurs, and HTML code is searched for entries containing image file extensions and, in some embodiments, video file extensions. In response to locating image file extensions and, in some embodiments video file extensions, the associated online digital image or online digital video is downloaded. Simultaneously, at Event 540, virtual surveillance drones are deployed in one or more virtual reality computing environments to search for and capture virtual images depicting in the virtual reality computing environments. In some embodiments of the invention, the searching and capturing of images is limited to virtual images that potentially match the targeted digital images and/or the patterns of variance for the targeted digital images.

At Event 550, the online digital image or video is analyzed for matches between the online digital image (or images in frames of the digital video) and the targeted digital images and/or patterns of variance of the targeted digital image. In response to determining matches between the online digital image (or images in frames of the digital video) and the targeted digital images and/or patterns of variance of the targeted digital image, at Event 560, the online matching online digital images or videos are marked/tagged for potential removal (based on subsequent confirmation that the use is unauthorized or otherwise deemed to be nefarious in nature).

Referring to FIG. 6, a flow diagram is shown of a method 600 for detecting targeted images in a computing network, such as the Internet, in accordance with embodiments of the present invention. At Event 610, AI/ML techniques are implemented to determine patterns of variance (i.e., possible alterations, such as, but not limited to, changes in color, clarity, distortion, clarity, shading and the like) for targeted digital images. In response to determining the patterns of variance, at Event 620, the targeted digital images and the corresponding patterns of variance are stored in a database.

At Event 630, navigation to predetermined websites occurs and the HTML code is accessed and searched for entries/hyperlinks (i.e., Universal Resource Locators (URLs)) that include image file extensions (e.g., .jpeg, .tiff, .png, .gif, .pdf and the like) and, in some embodiments of the method, video file extensions (e.g., .mpeg, .mp4, .mov, .avi and the like). For each hyperlink/URL containing an image file extension or video file extension, at Event 640, the hyperlink/URL is activated to navigate to a webpage depicting online digital image or presenting the online digital video associated with the corresponding image or video file extension and the online digital image or video is downloaded for subsequent analysis.

At Event 650, the downloaded online digital images and videos are analyzed by accessing the database and comparing the downloaded online digital images and videos to the targeted digital images and/or patterns of variance corresponding to the targeted digital images. In response to determining a match between downloaded online digital images and videos to the targeted digital images and/or patterns of variance corresponding to the targeted digital images, the matching online digital images and videos are tagged or otherwise marked for potential take down/removal from the websites based on authorized and/or illegal use.

Thus, present embodiments of the invention discussed in detail above, provide for a comprehensive system for detecting targeted images, as well as variations thereof within computing networks, such as the Internet and the Metaverse. In terms of the Internet, the system navigates to predetermined websites and accesses the HTML code to search for image file extensions and in some instances video file extensions within the listing of URLs. In response to finding URLs with image or video file extensions, the hyperlink is activated to navigate to the webpage containing the associated image and the image is downloaded for purposes of target image detection analysis. Additionally, a virtual surveillance drone is deployed within virtual reality computing systems to navigate the entirety of the virtual reality environment and search for images that may be displayed and, more specifically, images that appear to match or resemble the targeted image. The drone is capable of capturing the images and communicating the images to non-virtual computing systems for purposes of target image detection analysis. Targeted image detection analysis provides for initially implementing machine learning techniques to learn patterns of variance associated with the target images. Once the patterns of variance have been determined, the image detection analysis involves comparing the images downloaded from the website or captured in the virtual reality computing environment to the actual targeted images and the patterns of variance to determine if a match exists.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automated targeted digital image detection within computing networks, the system comprising:
 a computing platform including a memory and one or more computing device processors in communication with the memory;
 image variation learning instructions stored in the memory, executable by at least one of the computing device processors and configured to:
  receive an image file comprising one or more targeted digital images,
  implement machine-learning techniques to determine patterns of variance for each of the one or more targeted digital images,
  store the one or more targeted digital images and corresponding patterns of variance in an image variance database;
 image searching and capturing instructions stored in the memory, executable by at least one of the computing device processors and configured to:
  automatically navigate to predetermined websites,
  at each of the predetermined websites, access Hyper-Text Markup Language (HTML) code and search the HTML code for hyperlinks including an image file extension or a video file extension,
  for each hyperlink that includes an image file extension, activate the hyperlink to navigate to a webpage depicting an online digital image associated with the corresponding image file extension and download the online digital image to image analysis instructions,
  for each of the hyperlinks including the video file extension, activate the hyperlink to navigate to a second webpage presenting an online digital video associated with the corresponding video file extension, and download the online digital video to the image analysis instructions; and
 the image analysis instructions that are executable by at least one of the computing device processors and configured to:
  receive the online digital images,
  capture each frame of the online digital videos,
  for each captured frame of the online digital videos, access the image variance database and compare images in the captured frame to the targeted digital images and the patterns of variance, and
  in response to determining a match between a least one of the images in the captured frame and at least one of (i) at least one the targeted digital images, and (ii) at least one of the patterns of variance associated with one of the targeted digital images, tag the at least one of the images in the captured frame for potential unauthorized use.

2. The system of claim 1, further comprising virtual surveillance drone instructions configured to be executed within one or more virtual reality computing environments, wherein the virtual surveillance drone instructions configured to:
 continuously navigate the one or more virtual reality computing environments and search for virtual images that potentially match the at least one of (i) at least one the targeted digital images, and (ii) at least one of the patterns of variance associated with one of the targeted digital images, wherein the virtual images are images displayed within the one or more virtual reality computing environments, and
 in response to determining that at least one virtual image potentially matches the at least one of (i) at least one the targeted digital images, and (ii) at least one of the patterns of variance associated with one of the targeted digital images, capture the at least one virtual image and communicate the at least one virtual image to the image analysis instructions.

3. The system of claim 2, wherein the image analysis instructions are further configured to:
 in response to receiving receive the at least one virtual image, analyze the at least one virtual image to confirm or deny that each of the at least one virtual image matches the at least one of (i) at least one the targeted digital images, and (ii) at least one of the patterns of variance associated with one of the targeted digital images.

4. The system of claim 1, further comprising website priority determining instructions stored in the memory, executable by at least one of the computing device processors and configured to determine at least one of (i) the predetermined websites, and (ii) a prioritization for execution of the image searching and capturing instructions at the predetermined websites based at least on one of (a) website type, and (b) domain name.

5. The system of claim 1, further comprising website priority determining instructions stored in the memory, executable by at least one of the computing devices and configured to determine at least one of (i) the predetermined websites, and (ii) a prioritization for execution of the image searching and capturing instructions at the predetermined websites by implementing machine-learning techniques that use results of previous executions of the image searching and capturing instructions and the image analysis instructions as input data.

6. The system of claim 1, further comprising website priority determining instructions stored in the memory, executable by at least one of the computing device processors and configured to determine at least one of (i) the predetermined websites, and (ii) a prioritization for execution of the image searching and capturing instructions at the predetermined websites by:

conducting text searches within websites for text related to the targeted digital images, and in response to determining that one or more of the websites include text related to the targeted digital images, performing at least one chosen from group consisting of (i) adding the one or more of the websites to a list of the predetermined website and (ii) prioritizing execution of the image searching and capturing instructions at the one or more of the websites.

7. The system of claim 1, further comprising website priority determining instructions stored in the memory, executable by at least one of the computing device processors and configured to exclude from the predetermined websites those websites authorized to depict the one or more targeted digital images.

8. The system of claim 1, further comprising unauthorized use inquiry communication generator instructions stored in the memory, executable by at least one of the computing device processors and configured to:

in response to tagging the at least one of the online digital images for potential unauthorized use, automatically perform at least one chosen from group consisting of (i) navigate to websites at which the at least one of the online digital images were downloaded and search for contact information associated with the websites and (ii) navigate to a lookup registrar to determine an entity associated with the websites, and generate, and initiate communication of, an unauthorized digital image use inquiry based on at least one chosen from the group consisting of (i) the contact information and (ii) the entity.

9. The system of claim 1, wherein the one or more targeted digital images are selected from the group consisting of (i) an image of a protected logo or branding mark and (ii) an image of an individual.

10. A computer-implementing method for automated targeted digital image detection within computing networks, the method executed by one or more computing processor devices and comprising:

implementing machine-learning techniques to determine patterns of variance for each of one or more targeted digital images, storing the one or more targeted digital images and corresponding patterns of variance in a database;

automatically navigating to predetermined websites, accessing HyperText Markup Language (HTML) code at the predetermined websites and searching the HTML code for hyperlinks including an image file extension or a video file extension;

for each of the hyperlinks including an image file extension, activating the hyperlink to navigate to a webpage depicting an online digital image associated with the corresponding image file extension and downloading the online digital image;

for each of the hyperlinks including the video file extension, activate the hyperlink to navigate to a second webpage presenting an online digital video associated with the corresponding video file extension and downloading the online digital video;

capturing each frame of the online digital video;

for each captured frame, accessing the database and comparing images in the captured frame to the targeted digital images and the patterns of variance; and in response to determining a match between a least one of the images in the captured frame and at least one of (i) at least one the targeted digital images, and (ii) at least one of the patterns of variance associated with one of the targeted digital images, tagging the at least one of the images in the captured frame for potential unauthorized use.

11. The computer-implemented method of claim 10, further comprising:

executing a virtual surveillance drone in one or more virtual reality computing environments to continuously navigate the one or more virtual reality computing environments and search for virtual images that potentially match the at least one of (i) at least one the targeted digital images, and (ii) at least one of the patterns of variance associated with one of the targeted digital images, wherein the virtual images are images displayed within the one or more virtual reality computing environments;

in response to determining that at least one virtual image potentially matches the at least one of (i) at least one the targeted digital images, and (ii) at least one of the patterns of variance associated with one of the targeted digital images, capturing the at least one virtual image; and analyzing the captured at least one virtual image to confirm or deny that each of the at least one virtual image matches the at least one of (i) at least one the targeted digital images, and (ii) at least one of the patterns of variance associated with one of the targeted digital images.

12. The computer-implemented method of claim 10, further comprising:

determining at least one chosen from the group consisting of (i) the predetermined websites, and (ii) a prioritization for navigating to the predetermined websites.

13. The computer-implemented method of claim 10, further comprising:

in response to tagging the at least one of the online digital images for potential unauthorized use, automatically performing at least one chosen from group consisting of (i) navigate to websites at which the at least one of the online digital images were downloaded and search for contact information associated with the websites and (ii) navigate to a lookup registrar to determine an entity associated with the websites, and generating, and initiating communication of, an unauthorized digital image use inquiry based on at least one chosen from the group consisting of (i) the contact information and (ii) the entity.

14. A computer program product comprising:

a non-transitory computer-readable medium comprising sets of codes for causing one or more computing processing devices to:

implement machine-learning techniques to determine patterns of variance for each of one or more targeted digital images, store the one or more targeted digital images and corresponding patterns of variance in a database;

automatically navigate to predetermined websites, access HyperText Markup Language (HTML) code at the predetermined websites and search the HTML code for hyperlinks including an image file extension or a video file extension;

for each HTML element that comprises the hyperlink including the image file extension, activate the hyperlink to navigate to a webpage depicting an online digital image associated with the corresponding image file extension and download the online digital image;

for each HTML element that comprises the hyperlink including the video file extension, activate the hyperlink to navigate to a second webpage presenting an online digital video associated with the corresponding video file extension and downloading the online digital video;

capture each frame of the online digital video;

for each captured frame, access the database and comparing images in the captured frame to the targeted digital images and the patterns of variance; and in response to determining a match between a least one of the images in the captured frame and at least one of (i) at least one the targeted digital images, and (ii) at least one of the patterns of variance associated with one of the targeted digital images, tag the at least one of the images in the captured frame for potential unauthorized use.

15. The computer program product of claim 14, wherein the sets of codes further comprise a sets of codes for causing the one or computing processor devices to:

execute a virtual surveillance drone in one or more virtual reality computing environments to continuously navigate the one or more virtual reality computing environments and search for virtual images that potentially match the at least one of (i) at least one the targeted digital images, and (ii) at least one of the patterns of variance associated with one of the targeted digital images, wherein the virtual images are images displayed within the one or more virtual reality computing environments;

in response to determining that at least one virtual image potentially matches the at least one of (i) at least one the targeted digital images, and (ii) at least one of the patterns of variance associated with one of the targeted digital images, capture the at least one virtual image; and analyze the captured at least one virtual image to confirm or deny that each of the at least one virtual image matches the at least one of (i) at least one the targeted digital images, and (ii) at least one of the patterns of variance associated with one of the targeted digital images.

16. The computer program product of claim 14, wherein the sets of codes further comprises a set of codes for causing the one or more computing processing devices to:

determine at least one chosen from the group consisting of (i) the predetermined websites, and (ii) a prioritization for navigating to the predetermined websites.

* * * * *